(12) United States Patent
Elliott

(10) Patent No.: US 7,392,378 B1
(45) Date of Patent: Jun. 24, 2008

(54) METHOD AND APPARATUS FOR ROUTING DATA TRAFFIC IN A CRYPTOGRAPHICALLY-PROTECTED NETWORK

(75) Inventor: Brig Barnum Elliott, Arlington, MA (US)

(73) Assignees: Verizon Corporate Services Group Inc., New York, NY (US); BBN Technologies Corp., Cambridge, MA (US)

( * ) Notice: Subject to any disclaimer, the term of this patent is extended or adjusted under 35 U.S.C. 154(b) by 743 days.

(21) Appl. No.: 10/392,492

(22) Filed: Mar. 19, 2003

(51) Int. Cl.
*H04L 9/00* (2006.01)

(52) U.S. Cl. .................... 713/153; 726/13; 726/11; 380/277; 380/278; 380/279

(58) Field of Classification Search ......... 713/150–154; 380/255–257, 277, 278, 279, 44, 28; 709/230, 709/232, 238–244, 223, 220; 726/11–14; 370/254, 351, 400, 401, 412, 431, 464, 229
See application file for complete search history.

(56) References Cited

U.S. PATENT DOCUMENTS

| | | | | |
|---|---|---|---|---|
| 5,459,717 A * | 10/1995 | Mullan et al. | ................ | 370/351 |
| 5,915,025 A * | 6/1999 | Taguchi et al. | ................ | 380/44 |
| 6,240,514 B1 * | 5/2001 | Inoue et al. | ................ | 713/153 |
| 6,295,361 B1 * | 9/2001 | Kadansky et al. | ........... | 380/278 |
| 6,317,831 B1 * | 11/2001 | King | ........................... | 713/171 |
| 6,463,068 B1 | 10/2002 | Lin | | |
| 6,463,537 B1 * | 10/2002 | Tello | ........................... | 713/182 |
| 6,510,349 B1 * | 1/2003 | Schneck et al. | ................ | 700/9 |
| 6,578,086 B1 * | 6/2003 | Regan et al. | ................ | 709/242 |
| 6,690,798 B1 * | 2/2004 | Dent | ........................... | 380/248 |
| 6,744,774 B2 * | 6/2004 | Sharma | ....................... | 370/401 |
| 6,850,524 B1 * | 2/2005 | Troxel et al. | ........... | 370/395.32 |
| 6,895,091 B1 * | 5/2005 | Elliott et al. | ................ | 380/278 |
| 6,967,958 B2 * | 11/2005 | Ono et al. | ..................... | 370/401 |
| 6,976,087 B1 * | 12/2005 | Westfall et al. | ............. | 709/238 |
| 6,980,659 B1 * | 12/2005 | Elliott | ........................ | 380/277 |
| 7,006,633 B1 * | 2/2006 | Reece | ........................ | 380/260 |
| 7,068,790 B1 * | 6/2006 | Elliott | ........................ | 380/278 |
| 7,219,223 B1 * | 5/2007 | Bacchus et al. | ............. | 713/150 |
| 2001/0005885 A1 * | 6/2001 | Elgamal et al. | ............. | 713/164 |
| 2003/0002674 A1 * | 1/2003 | Nambu et al. | ............... | 380/256 |
| 2003/0149883 A1 * | 8/2003 | Hopkins et al. | ............. | 713/191 |
| 2004/0120528 A1 * | 6/2004 | Elliott et al. | ................ | 380/278 |
| 2004/0196808 A1 * | 10/2004 | Chaskar et al. | ............. | 370/331 |

OTHER PUBLICATIONS

Violations of a New Inequality for Classical Fields; Fransom, J.D.; John Hopkins University; NTIS-NASA Publication; Goddard Space Flight Center; Workshop on Squeezed States and Uncertainty Relations, Feb. 1991, pp. 23-32.

(Continued)

*Primary Examiner*—Nasser Moazzami
*Assistant Examiner*—Nirav Patel

(57) ABSTRACT

The present invention is useful for routing data traffic in data communications networks where some or all of the network interface links are protected by cryptographic techniques, e.g., encryption. The invention routes datagram traffic in such networks toward interface links perceived to have strong encryption protection and away from interface links perceived to have weak or weakening encryption protection, based on the remaining encryption capacity for such links.

69 Claims, 8 Drawing Sheets

OTHER PUBLICATIONS

Perlman, Radia. Interconnections: Bridges, Routers, Switches and Internetworking Protocols (Second Edition). Chaps. 10, 12, 14, 16, 17 and 18. Addison Wesley, 2000.

Stevens, W. Richard. TCP/IP Illustrated, vol. 1: The Protocols. Addision-Wesley, 1994.

Shneier, Bruce. *Applied Cryptography: Protocols, Algorithms and Source Code in C* (Second Edition). John Wiley & Sons, Inc., 1996.

Floyd, S., and Jacobson, V., *Random Early Detection gateways for Congestion Avoidance*. V.1 N.4, Aug. 1993, p. 397-413. Abstract.

Braden B., Clark, D., Crowcroft, J., Davie, B., Deering, S., Estrin, D., Floyd, S., Jacobson, V., Minshall, G., Partridge, C., Peterson, L., Ramakrishnan, K., Shenker, S., Wroclawski, J., Zhang, L. *Recommendations on Queue Management and Congestion Avoidance in the Internet*. Apr. 1998.

Floyd, S., and Fall, K. *Promoting the Use of End-to-End Congestion Control in the Internet*. IEEE/ACM Transactions on Networking, vol. 7, No. 4, Aug. 1999.

Elloumi, O., and Afifi, H., *RED Algorithm in ATM Networks*. IEEE Tech Report, Jun. 1997.

Lin, D. and Morris, R., *Dynamics of Random Early Detection*. Proceedings of SIGCOMM '97. Sep. 1997.

Feng, W., Kandlur, D.,Saha, D., Shin, K., *Techniques for Eliminating Packet Loss in Congested TCP/IP Networks*, U. Michigan CSE-TR-349-97, Nov. 1997.

Jacobson, V., *Notes on using RED for Queue Management and Congestion Avoidance*. Nanog 13 Viewgraphs. Dearborn, MI. Jun. 1998.

Rosolen, V., Bonaventure, O., and Leduc, G. *A RED Discard Strategy for ATM Networks and its Performance Evaluation with TCP/IP Traffic*, Proceedings of the 6th Workshop on Performance Modelling and Evaluation of ATM Networks (IFIP ATM '98) Ilkley, UK, Jul. 1998.

Cisco IOS Software Releases 12.2: Configuring Weighted Random Early Detection, URL: http://www.cisco.com/univercd/cc/td/doc/product/software/ios122/122cgcr/fgos_c/fqcprt3/qcfwred.pdf, Printed Jan. 10, 2003.

* cited by examiner

METHOD AND APPARATUS FOR ROUTING DATA TRAFFIC IN A CRYPTOGRAPHICALLY-PROTECTED NETWORK

STATEMENT REGARDING FEDERALLY SPONSORED RESEARCH OR DEVELOPMENT

This invention was made with Government support under Contract No. F30602-01-C-0170, awarded by Defense Advanced Research Projects Agency. The Government has certain rights in this invention.

RELATED APPLICATIONS

This application is related to a co-pending application entitled, METHOD AND APPARATUS FOR CONTROLLING THE FLOW OF DATA ACROSS A NETWORK INTERFACE, application Ser. No. 10/391,582, filed on even date herewith and assigned to the assignee of the present application, and the entirety of which is incorporated herein by this reference.

BACKGROUND OF THE INVENTION

1. Field of Art

The present invention relates generally to the field of data communications networks, and more particularly to data communications networks protected by cryptographic techniques (e.g., encryption). Still more particularly, the present invention relates to systems and methods for routing data traffic in cryptographically-protected data communications networks.

2. Related Art

Data communications networks are typically comprised of a set of nodes (e.g., computers, routers and/or switches) connected by a set of interface links (e.g., wires, cable, fiber, microwave or radio wave channels, etc.). In a data communications network, a node is a connection point, either a redistribution point or an end point, for data transmissions. In general, a node (especially if the node is a switch or router) has a programmed or engineered capability to recognize, process and/or forward data traffic to other nodes.

A "router" is a device or, in some cases, software in a computer, that determines the next connection point to which a packet of data should be forwarded toward its final destination. A router is connected to at least two network interface links and determines which way to send each data packet based on its current understanding of the state of the links to which it is connected. A router may be located at any network gateway (where one network meets another), including, for example, host computers and points-of-presence on the Internet. Put another way, a router is a device or program that determines the route and specifically to which adjacent connection point in a network a data packet should be sent.

A router is often included as part of a network "switch," which is also a network device that selects a path or circuit for sending a packet of data to its next destination. In general, however, a switch is a simpler and faster mechanism than a router. A router may create or maintain a table of available routes and their conditions and use this information, along with distance and cost algorithms, to determine the best route for a given data packet. Routers and switches may both be configured to implement schemes to control the network links used to transmit data packets to their destinations, as well as the order and speed in which data or data packets flow over a given link. However, switches are generally less sophisticated than routers in terms of the algorithms and the quantity and quality of network information it uses.

Often the links in a data communications network are "weighted" or assigned numeric values to reflect some functional, qualitative or quantitative aspect of each link, such as its capacity to transmit data traffic. These numeric values are often called link metrics. Conventional routers and switches use algorithms based on link metrics to determine the "best path" to send a data packet to its intended destination. Several well-known algorithms, such as Shortest Path First Routing (sometimes called Link State Routing), or Distance Vector Routing, and their many variants, for example, have been advantageously applied in the data communications industry to optimize routing of data traffic through data communications networks.

Some types of secure networks employ a technique called "link encryption." Link encryption (also called "link level encryption" or "link layer encryption") is a data security process for encrypting information at the data link level as it is transmitted between two points within a data communications network. In such networks, a data packet is considered to exist "in the clear" while it is still located in a first network routing device's memory. The data packet is encrypted before it is sent across the link from this first network routing device to a second network routing device, and then is decrypted as it is received at the second network routing device. It is again considered to be "in the clear" when it arrives in an unencrypted state in the second network routing device's memory. A given data packet may thus proceed hop by hop through the data communications network, being encrypted before it is sent across each link, and then decrypted after it is received from that link.

The actual link encryption and decryption of the data is generally performed by cryptographic devices and/or algorithms, known as "cryptos." Link encryption typically requires a pair of collaborating cryptos—one at each end of a link. Cryptos may reside in the router, the switch or elsewhere in the data communications network as stand-alone devices, computers or computer programs.

In most cases, a pair of collaborating cryptos will share a secret encryption "key." An encryption key typically comprises a variable value that is applied (according to an algorithm usually) to a string or block of unencrypted data to produce encrypted data, or applied to a string or block of encrypted data to produce unencrypted data. The length or number of bits in the encryption key is usually a significant factor in how difficult it will be for an unauthorized recipient of a an encrypted data packet to decrypt the data packet. Typically, an "upstream" crypto will use the encryption key to encrypt a packet's contents before the packet is transmitted across the link, and a "downstream" crypto will use the same encryption key to decrypt the packet upon receipt.

Often it is deemed undesirable to use the same encryption key for too long a period of time because the more traffic encrypted with a single encryption key, the easier the encryption code is to break. If an unauthorized person breaks the encryption code, then the security and/or integrity of the data traffic may be compromised. The more data traffic that has been encrypted with a given key, the more data traffic will be compromised if that encryption code is broken. Thus, encryption keys are often changed from time to time, e.g., weekly, daily, or even from minute to minute. Usually, when a key is changed, it must be changed at both the upstream and downstream cryptos. One approach is to change keys after a certain number of traffic bytes have passed through the crypto. For example, the two cryptos might be configured so that they switch to new encryption keys once five megabytes of data traffic has been encrypted (and/or decrypted) under the previous key. Alternatively, the keys may be updated periodically, for example once per hour. When using one of these approaches, the term "remaining encryption capacity" may be used to refer to the number of additional bytes of data traffic that can be encrypted, or the remaining amount of time that encryption may be applied on a link before all of the keys or key material currently on hand will be exhausted.

In the data communications network industry, many different techniques are used to supply cryptos with encryption keys. One common technique, appropriately termed "sneaker net," is to have a trusted person carry the keys in some kind of physical container (such as a laptop computer or more specialized device) from one crypto to another. Another common technique employs mathematical algorithms and specialized cryptographic protocols, such as the well-known Diffie-Hellman Key Exchange Technique. A third technique that is now becoming more popular is quantum cryptography.

Quantum cryptography differs from traditional cryptographic systems in the sense that it depends more on physics, rather than mathematics, as the central aspect of its security model. Basically, quantum cryptography relies on the use of individual particles and waves of light (photons) and their intrinsic quantum properties to develop what is essentially an unbreakable encryption scheme—because it is impossible to measure the quantum state of any system without disturbing that system. It is theoretically possible that other particles could be used, but photons have been found to work very well for transmitting encryption key data. Moreover, photon behavior is relatively well-understood, and they are the information carriers in optical fiber cables, one of the most promising medium for extremely high-bandwidth data communications.

Each of the above-described techniques for supplying keys and key material to cryptos, including the quantum cryptography key distribution method, takes some time to employ. Thus, it is possible that the new key material will not be delivered in time, i.e., before too much time has passed using the old key, or before too many bytes of data traffic have been encrypted via the old key. While the link may continue to operate—it may be considered "insecure" or "degraded" because the data traffic can no longer be encrypted or because a particular key has been used longer than desired and therefore may no longer be trusted as secret. Alternatively, such links may be abruptly removed from service until new keys are supplied and made operational, thereby adding a measure of congestion and/or denied access to the data communications network.

Among other shortcomings, conventional routing systems for data communications networks (including those described above) do not take remaining encryption capacity into account when making routing decisions. From a routing, point of view, the links between connection points in an encrypted network are usually assumed to be encrypted. Consequently, when a crypto runs out of keying material, the link continues to operate in an "unsecure" or "degraded" fashion or, alternatively, is abruptly taken out of service. Attempts to transmit highly-sensitive data traffic across unsecure, congested or inaccessible links may pose too great a risk in some data communications contexts. In a military context, for example, whether certain data transmissions reach their intended destination on time, with absolute secrecy and with unquestionable integrity could mean the difference between life and death.

Accordingly, there is a need for systems and methods of routing data traffic in cryptographically-protected networks where the remaining encryption capacity of links contained in the network is taken into consideration (i.e., used as a "link metric") for making routing decisions. There is a further need for such systems and methods to include programs and devices that generate, report and analyze remaining encryption capacity data and distribute the results to other network routing programs and devices in the data communications network. The other network routing devices may then use the remaining encryption capacity data to help determine the optimal path for routing data traffic.

SUMMARY OF INVENTION

In general, the invention comprises a system for routing data packets over a selected network interface link of a data communications network. New encryption keys are stocked in a specified storage area somewhat ahead of the time they are actually needed by a crypto. In fact, several keys may be stocked in several storage locations in advance, thus making up a kind of "key reservoir" for each crypto or for each pair of cryptos. The keys stocked in the key reservoirs may get used up at some rate—either a fixed rate based on elapsed time, or a variable rate based on the amount of data traffic that happens to pass through the cryptos. The keys may also be replenished at some rate, i.e., however fast new keys can be delivered to the cryptos.

A system configured according to the present invention includes a network routing device, such as a network router or switch, coupled to at least two potential network interface links. Each one of the potential network interface links is protected by a cryptographic subsystem comprising key material stored in a key storage area, a cryptographic engine configured to use at least a portion of the key material to encrypt data packets before transmitting the data packets over the selected network interface link, and a key storage area information channel configured to convey to the network routing device a report comprising an indicator of a remaining encryption capacity for the cryptographic subsystem. The network routing device determines, based on the indicator, which one of the potential network interface links will be selected for use in the transmission of data packets.

In some embodiments of the invention, the indicator may be based on several factors, including, for example: (1) the amount of key material in the key storage area; (2) data representing an amount of time elapsed since a prior report was conveyed; (3) data representing the amount of time elapsed since the key material was replenished; (4) data representing a quantity of data packets encrypted by the cryptographic subsystem since a prior report was conveyed; (5) the quantity of additional data packets the cryptographic engine can encrypt prior to the key material in the key storage area being exhausted; (6) a rate at which the key material is being used by the cryptographic engine; or (7) some combination of one or more of these factors (1)–(6). This list is not meant to exhaust all the possible time and quantitative factors the indicator may be based upon. Those skilled in the art would recognize, for example, and appreciate the fact that the indicator may also be based on one or more other factors not listed here without departing from the scope and design of the present invention.

In a preferred embodiment, the network routing device may be configured to include a database for storing the report. The networking device may also have a statistical analyzer configured to generate an "estimated" remaining encryption capacity based on the report. In some configurations, the report may be conveyed to the network routing device, for example, when the amount of key material in the key storage area reaches a specified level, when the key material has been present in the key storage area for a specified time period, in response to an occurrence of a specified event, or in response to a specified condition for the interface link.

A data communications network routing system in accordance with the present invention may also comprise a combination of computer hardware and software components. In one example of this embodiment, the invention comprises a programmed computer coupled to at least two network interface links, the programmed computer comprising a memory having at least one region for storing computer executable program code and a processor for executing the program code stored in the memory. The programmed code is configured to determine which one of the at least two network interface links will be selected to transmit encrypted data packets. The programmed code makes this determination in response to a report received from a cryptographic subsystem indicating a remaining encryption capacity for the cryptographic subsystem.

In another aspect of the present invention, a method for routing data packets over a selected network interface link of a data communications network is provided. The method comprises the steps of: (1) providing a network routing device coupled to at least two network interface links, at least one of the two network interface links being protected by a cryptographic subsystem configured to encrypt data packets; (2) receiving a report from the cryptographic subsystem comprising an indicator of a remaining encryption capacity for the cryptographic subsystem; (3) determining, based on the indicator, which one of the at least two network interface links will be the selected network interface link; and (4) transmitting the data packets over the selected network interface link.

In a preferred embodiment, the present invention may be advantageously combined with methods and apparatuses for controlling the flow of data traffic over encrypted links in a cryptographically-protected data communications network. Several such methods and apparatuses are described in a co-pending application entitled, METHOD AND APPARATUS FOR CONTROLLING THE FLOW OF DATA ACROSS A NETWORK INTERFACE, application Ser. No. 10/391,582, filed on even date herewith and assigned to the assignee of the present application, the entirety of which is incorporated herein by reference.

Using an analogy to air travel, where a passenger is to travel from Washington, D.C. to a final destination of Las Angeles, Calif., a routing system in accordance with the present invention is like the airline, which determines whether the passenger will take the plane going through Dallas or the one going through Chicago. A flow control system in accordance with the above-identified co-pending application Ser. No. 10/391, 582, however, is like the gate agent and air traffic controller, who determine, not which plane to put the passenger on, but the order and priority in which the passenger will board the plane (relative to all the other passengers boarding the same plane), and the timing and speed with which the plane will leave the gate and take off. The order in which the passenger boards the plane may depend on any number of relevant factors, such as whether the passenger has purchased first class, business class or some other priority class of service. However, the timing and speed with which the plane leaves the gate and takes off may depend on other factors, such as the weather or congestion on the runways or in the anticipated flight path.

FEATURES AND ADVANTAGES OF THE PRESENT INVENTION

It is a feature of the present invention that it includes an information channel configured to provide reports indicating a remaining encryption capacity for one or more network interface links.

It is another feature of the present invention that it provides a mechanism for making routing decisions based on the remaining encryption capacity of interface links in the data communications network.

It is yet another feature of the present invention that it can be further configured, using optional database and statistical analysis tools, to calculate, use and distribute estimates of future remaining encryption capacity.

Data communications networks employing the invention have significant advantages over conventional systems. First, they can steer traffic toward links where keying material is either in abundant supply or is being used at a slower rate, thereby avoiding situations where critical and/or confidential data traffic is compromised or delayed by links that have become unsecure or removed from service altogether. Second, they can be configured to "load balance" traffic across encrypted links so that cryptos in the network run down at roughly the same rate, instead of having one crypto run down completely before the other is utilized. Such load balancing helps create a more stable and reliable data transmission environment. Third, they can steer different types of traffic across different encrypted links, depending on a priority value associated with the type of traffic being transmitted. For instance, very important traffic may be sent via a direct path or one that may have a relatively large encryption capacity remaining, while less important traffic is routed via an indirect path or one that has relatively little encryption capacity remaining.

DETAILED DESCRIPTION OF THE PREFERRED EMBODIMENTS

With reference now to the figures, a detailed discussion is presented first for conventional routing systems for data communications networks and then for embodiments of routing systems of the present invention. Notably, the present invention may be implemented using software, hardware or any combination thereof, as would be apparent to those of skill in the art. The figures and examples below are not meant to limit the scope of the present invention or its embodiments or equivalents.

Figure 1A:
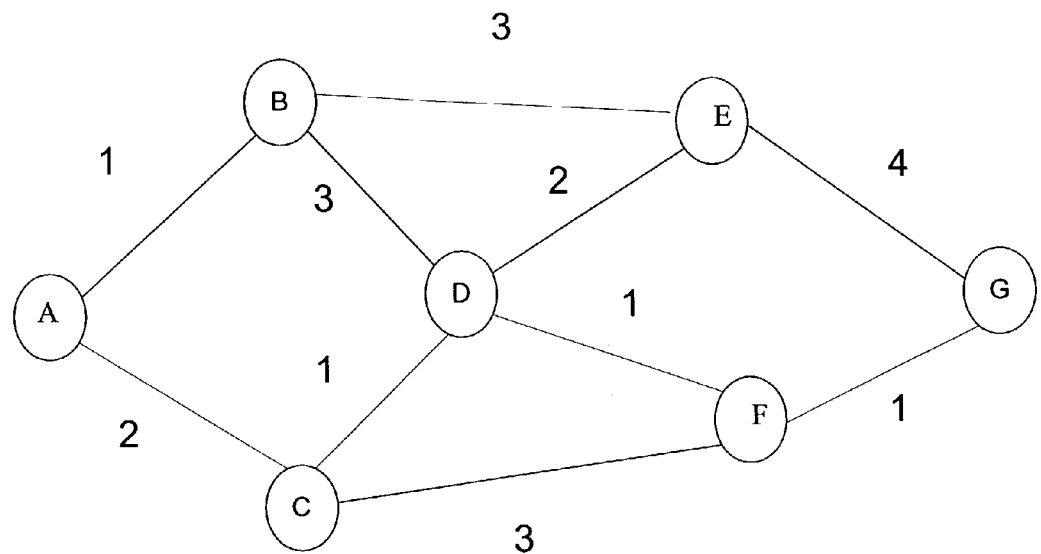
FIGS. 1A and 1B depict conventional data communications networks. The numerical values associated with each interface link indicate the link metrics for that link.

FIG. 1A shows a classic "weighted graph" diagram for a conventional data communications network. The diagram includes "duplex" link metric references, which means a single numeric value, or weight, is associated with each link to represent a quantitative or qualitative aspect of the link regardless of the direction in which data flows along that link. In situations where an important functional, quantitative or qualitative aspect of each link differs depending on the direction in which data traffic flows along the link, "simplex" link metric references may be used, i.e., assigning two weights to each link (one for each direction of data traffic flow). As FIG. 1A illustrates, data traffic traveling from Node A to Node G may get there by traveling along a variety of different paths, such as the path described by route A-B-E-G, or route A-C-F-G, or route A-B-D-F-G, and so on. The best, most efficient, or most secure route, however, may be determined by a calculation based, at least in part, on the link metrics (weights) assigned to each of the links between the nodes in the set of potential routes.

Figure 1B:
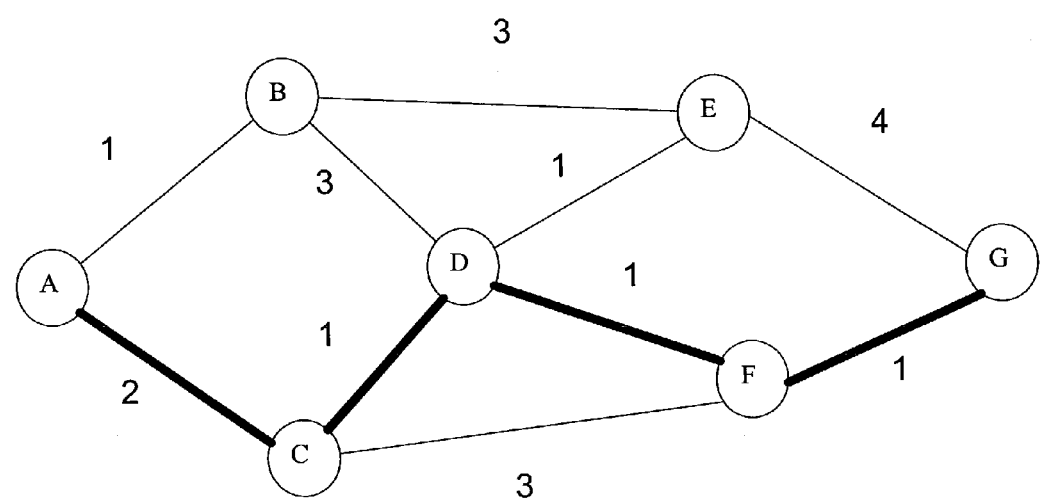

FIG. 1B, for example, shows the best route for a datagram traveling from Node A to Node G based on a "shortest path" calculation, i.e., the path whose arithmetical total of link metrics (weights) is least. In this example, the route A-C-D-F-G describes the "best" path, because it is the path with the least arithmetic sum of its link metrics. In some situations, it may be advantageous to define "best" in some other way, e.g., greatest arithmetic sum, or the path with the maximal value of the worst (minimal) link metric along that path, etc.

Figure 2:
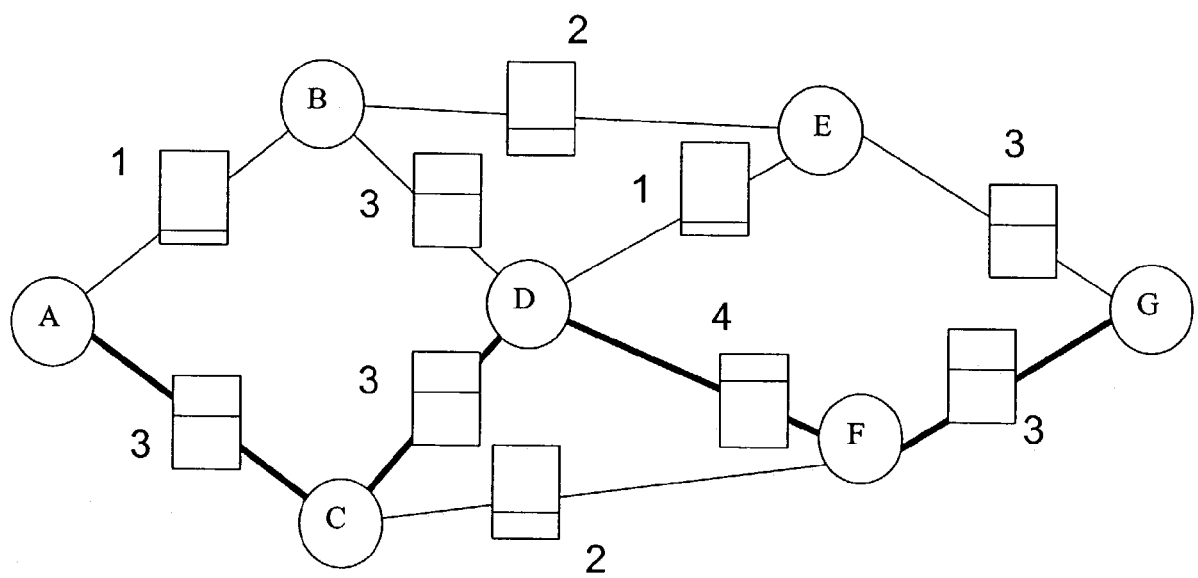
FIG. 2 depicts a block diagram of a data communications network configured in accordance with one embodiment of the present invention, wherein the link metric associated with each link comprises a numerical value representing the amount of keying material contained in a key reservoir or key storage area.

FIG. 2 contains a block diagram of a data communications network configured to operate in accordance with the present invention. The key material storage area or key reservoir associated with each link in the network indicates how many bits of keying material are still available for use along that link. These bits typically get "burned up" at some speed as data traffic passes along that link. For the simple case illustrated by FIG. 2, in which the same key material is used regardless of the direction the data travels, the key reservoir is shown directly atop the link. One skilled in the art, however, would recognize and appreciate that in a network configured in accordance with the present invention, the key reservoirs may be located at either end of the links, at locations remote from the links, such as on host computers coupled to the network, or elsewhere in the network.

In a preferred embodiment, and as illustrated in FIG. 2, the link metrics associated with each link indicate the amount of keying material left in the reservoir for that link, measured in terms of the number of megabytes of remaining data traffic that can be passed across this link using the remaining key material. Thus, a link labeled with the number 3 may be interpreted to mean that, as of the time of this snapshot, an additional 3 megabytes of data traffic could pass across this link without exhausting the key material in the associated key reservoir.

In a data communications network like the one depicted in FIG. 2, certain links may be very close to running out of keying material (the link between nodes D and F, for example), while others may have key material to spare (e.g. the link between nodes F and G). The present invention provides a way of routing traffic through such networks in such a way as to steer it away from links that are running short of keying material, and towards links that have plenty of keying material. In particular, the invention provides a way to route data traffic by selecting a path (or paths) based on remaining encryption capacity, which in turn is based on the availability of additional key material. In the example depicted in FIG. 2, for instance, the best path would be along the route A-C-D-F-G.

Figure 3:
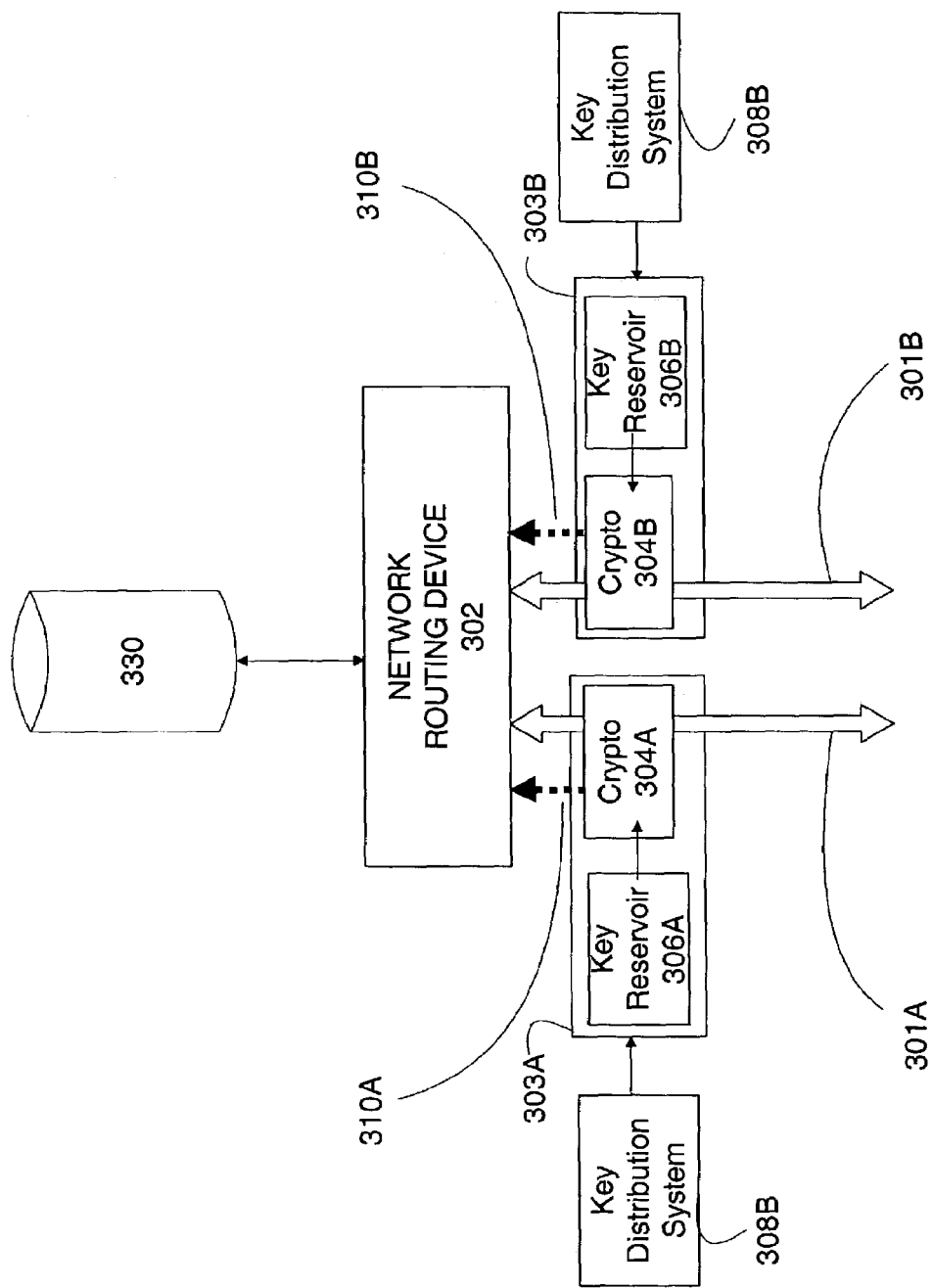
FIG. 3 depicts a block diagram illustrating a system for routing data traffic in a cryptographically-protected network in accordance with one embodiment of the present invention.

FIG. 3 contains a high-level block diagram illustrating one arrangement of components in an embodiment of the present invention. The embodiment comprises a network routing device 302, coupled to two network interface links 301A and 301B, which are protected by cryptographic subsystems (or "cryptos") 303A and 303B. It will be understood by one of skill in the art that the network routing device could be connected to more or fewer links without departing from the scope of the invention. Moreover, it is not necessary that all links connected to the network routing device be cryptographically protected in order to achieve some of the benefits of using the present invention. It may also be possible, depending on the nature of the network, the interface links and the data traffic, to use a single cryptographic subsystem to provide protection for multiple interface links, or multiple cryptographic subsystems to protect a single interface link. Such alternative arrangements are within the scope of the present invention.

The cryptographic subsystems 303A and 303B depicted in FIG. 3 comprise cryptographic engines 304A and 304B, which are configured to use key materials to encrypt data traffic before transmitting the encrypted data traffic over interface links 301A and 301B. Cryptographic subsystems 303A and 303B also comprise key storage areas or "key reservoirs" (depicted in FIG. 3 as 306A and 306B), where the key material is stored until it is ready to be used by cryptographic engines 304A and 304B. For purposes of the present invention, almost any form of digital or analog memory storage space or data depository area may be suitably adapted for use as a key reservoir. Such memory areas may comprise, for example, a computer's random access memory (RAM), a hard disk, a floppy disk, a compact or flash memory card, a CD-ROM, or tape backup system.

The data stored in a key storage area or reservoir may be of two different types. First, it may consist of actual bits of key material—e.g. 2,000 bits of keying material—that has yet to be inserted into the cryptographic engine. In most cases, however, key material is not used up on a bit-for-bit basis with data traffic. That is, a key that is 1,000 bits long might be used to encrypt (say) 100 Megabytes of data traffic, assuming that the key has been supplied as input to a high-enough quality cryptographic algorithm. Thus, even if the reservoir is empty (i.e. there are zero bits of keying material in the reservoir waiting to be used by the cryptographic engine), the system may still have a non-zero measure for the amount of data traffic that can still be safely encrypted with the keying material already in the cryptographic engine.

Consequently, the content of the key storage area or reservoir does not have to be measured in bits of keying material.

In some embodiments, it may be beneficially measured, for example, as (a) a current snapshot of how many more bytes of data traffic may be encrypted with the remaining key material in the crypto subsystem (both that is already in the crypto itself plus any in additional memory), or (b) that same snapshot augmented by a current indication of the rate at which the key material is being used up (i.e., the key material "burn rate"). The burn rate may be measured in a convenient unit, such as bits/second.

In some cases, the burn rate for the key material may be more important than the number of bytes of key material. For instance, if a link has a remaining encryption capacity of 100 Megabytes but is currently passing 100 Megabytes/second of data traffic, its reservoir will be exhausted in 1 second. A different link running at 10 Megabytes with the same remaining encryption capacity will be exhausted in 10 seconds. Measured in bytes of data traffic they can encrypt, both links have equivalent remaining encryption capacity. However, if some data traffic in the network has been granted a higher priority (perhaps because it is more urgent and/or more sensitive), it may be wise to route such traffic over the 10 Megabyte link because that link is less likely to be removed from service in the next second.

In a preferred embodiment, and as shown in FIG. 3, cryptographic subsystems 303A and 303B are coupled to network routing device 302 via key storage information channels 310A and 310B, which are used by cryptographic subsystems 303A and 303B to convey to the network routing device 302 information about their remaining encryption capacity. Such information may include, for example, how much keying material remains in key reservoirs 306A and 306B or how many more bytes of data traffic cryptographic subsystems 303A and 303B can encrypt before their current supply of keying material is exhausted and must be replenished.

FIG. 3 also depicts optional external Key Distribution Systems 308A and 308B, coupled to the cryptographic subsystems 303A and 303B, which supply key reservoirs 306A and 306B with additional keying material. Such key distribution systems may comprise having a human being deliver keying material to cryptographic subsystems 303A and 303B by hand (appropriately referred to as "sneaker-net"), connecting to cryptographic subsystems 303A and 303B by means of a modem or local area network (LAN) connection, utilizing some form of a random key material generator to provide new keys, etc. In a quantum cryptography system, keys are delivered to cryptographic subsystems 303A and 303B by quantum cryptographic protocol engines that may employ polarized or phase-encoded photons, among other techniques, in order to derive shared encryption keys, as described above. In a public-key based system, keys are delivered by means of a key agreement protocol such as the well-known Diffie-Hellman key exchange system. These are but a few examples of key distribution systems that may be advantageously configured to work with the present invention. Other key distribution systems (not described here) may be implemented by means known to those of skill in art.

Figure 4:
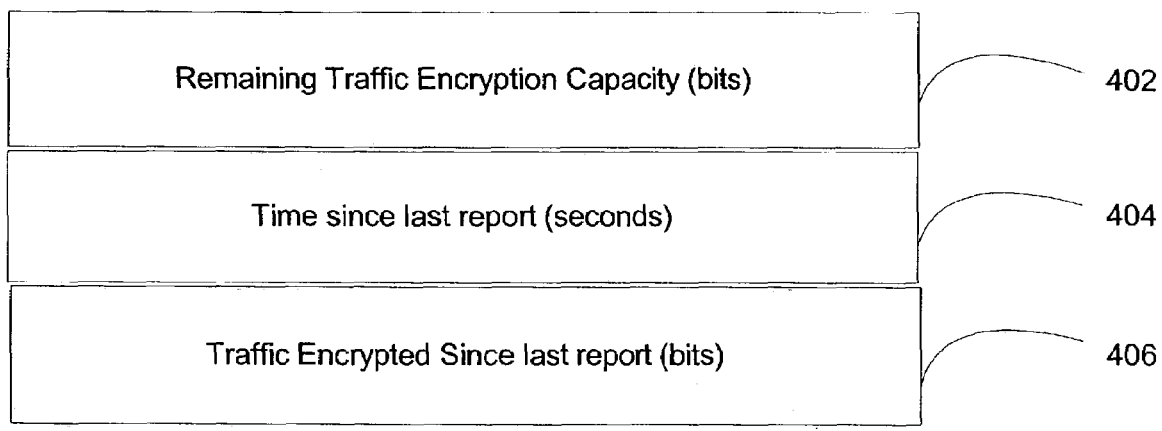
FIG. 4 depicts an exemplary format for a report generated by a cryptographic subsystem in one embodiment of the present invention.

The cryptographic subsystems 303A and 303B may be configured to generate remaining encryption capacity reports and deliver the reports to network routing device 302 at periodic intervals, whenever requested, or when some event occurs in the network. FIG. 4 shows an example of the contents of such a report. In this example, the report includes fields for the remaining encryption capacity 402, the time elapsed since the last report was sent 404, and the amount of traffic encrypted since the last report was sent 406.

In a preferred embodiment, the remaining encryption capacity for a given link is stored in a database (depicted as 330 in FIG. 3) configured, for example, to keep track of the remaining encryption capacity for all links in the data communications network. Database 330 may be updated at certain predefined time intervals or each time network routing device 302 receives a new report from other routing devices in the network or from cryptographic subsystems 303A and 303B. Thus, each network routing device can keep a table of the most up-to-date information for each of its encrypted links. In the embodiment depicted in FIG. 3, database 330 is coupled to network routing device 302. However, database 330 could be coupled to some other device or component in the network and serve the same function. The updates may be delivered to the database according to a routing protocol, for example, or by other means of transmitting control or network management traffic throughout a data communications network.

In a preferred embodiment, network routing device 302 also may be configured to share the remaining encryption capacity reports (or boiled-down information based on these reports) with other devices in the network, via a routing protocol, so that some or all of the other network routing devices in the network may ascertain the remaining encryption capacity or security status for any link in the network. These reports may be shared by using shared memory areas or registers, or by any other convenient means. One convenient means of accomplishing this is to use the Open Shortest Path First (OSPF) protocol, as described above with reference to FIG. 1B. Other routing protocols, such as Constraint-based Routing Label Distribution Protocol (CR-LDP), Intermediate System to Intermediate System (IS—IS) protocol, Multiprotocol Label Switching (MPLS), Asynchronous Transfer Mode (ATM), Resource Reservation Protocol (RSVP), Border Gateway Protocol (BGP), Simple Network Management Protocol (SNMP), Synchronous Optical Network (SONET) protocol, Internet Control Message Protocol (ICMP) and Routing Information Protocol (RIP), would work equally well. Indeed, remaining encryption capacity information can be distributed by essentially any kind of conventional routing protocol, once it has been extended to convey this new information.

RIP (Routing Information Protocol), for example, is a widely-used protocol for managing router information within a self-contained network such as a corporate local area network or an interconnected group of such LANs. Using RIP, a gateway host (with a network routing device, such as a router or switch) sends its entire routing table (which lists all the other hosts it knows about) to its closest neighbor host every 30 seconds. The neighbor host in turn will pass the information on to its next neighbor and so on until all hosts within the network have the same knowledge of routing paths, a state known as "network convergence." RIP uses a "hop" count (a "hop" being the trip a data packet takes from one router or intermediate point to another in the network) as an indication of network distance. (Other protocols use more sophisticated algorithms that include timing as well.) Each host in the network with a network routing device uses the routing table information to determine the next host to route a packet to for a specified destination.

In an embodiment of the present invention, the RIP protocol can be extended such that the routing table also contains information about the remaining encryption capacity for each link. Then each host in the network with a network routing device can use the remaining encryption capacity entries in the routing table to determine the next host to route a packet. More specifically, the network routing devices in the network may perform "shortest path" calculations, "maximal flow" calculations, or any other type of graph-theoretic calculations, based on the remaining encryption capacity, which will lead to the desired types of routes through the network. It is in this sense that the remaining encryption capacity becomes a new form of link metric. This new form of link metric can be used as the only metric for a given network link, or can be combined with other link metrics associated with data communications networks (such as link stability, link capacity, link delay) in order to make and carry out more complex routing decisions for data traffic.

If desired, the network routing device can also be configured to perform its own statistical analysis of the remaining traffic encryption capacity, rather than simply distributing the newest remaining encryption capacity report. For example, it might be configured to perform a time-series analysis to more accurately estimate the remaining encryption capacity of certain links. Other statistical analysis methods, such as using moving averages, least square estimates, or polynomial or robust estimators, could also be applied as is known in the art to better optimize routing of data traffic.

Network administrators may also decide to configure the network routing devices to use "high and low-water marks" in order to trigger network-wide routing table or database updates. As an example of this embodiment, a network routing device might receive a series of reports from one of its attached cryptographic subsystems but not distribute these reports to the rest of the network via a routing protocol until it learns that the remaining encryption capacity has fallen below a pre-established or critical "low water" mark. Then the network routing device would share this information, via a network-wide routing table or database update, so all other hosts and network routing devices in the network will know that the remaining encryption capacity is low for a given link and therefore not use that link. Over time, the key material for the unused link will be replaced or begin to accumulate. When the remaining encryption capacity is replenished and/or accumulates, the network routing device attached to that link may hold off broadcasting this fact to the rest of the network until some "high water" mark is reached, at which point it will issue a new routing update. This use of high and low water marks is generally employed in order to keep routing traffic in a network to some manageable level, rather than using network bandwidth to repeatedly update the entire network with relatively insignificant changes in remaining encryption capacity for every link.

Figure 5:
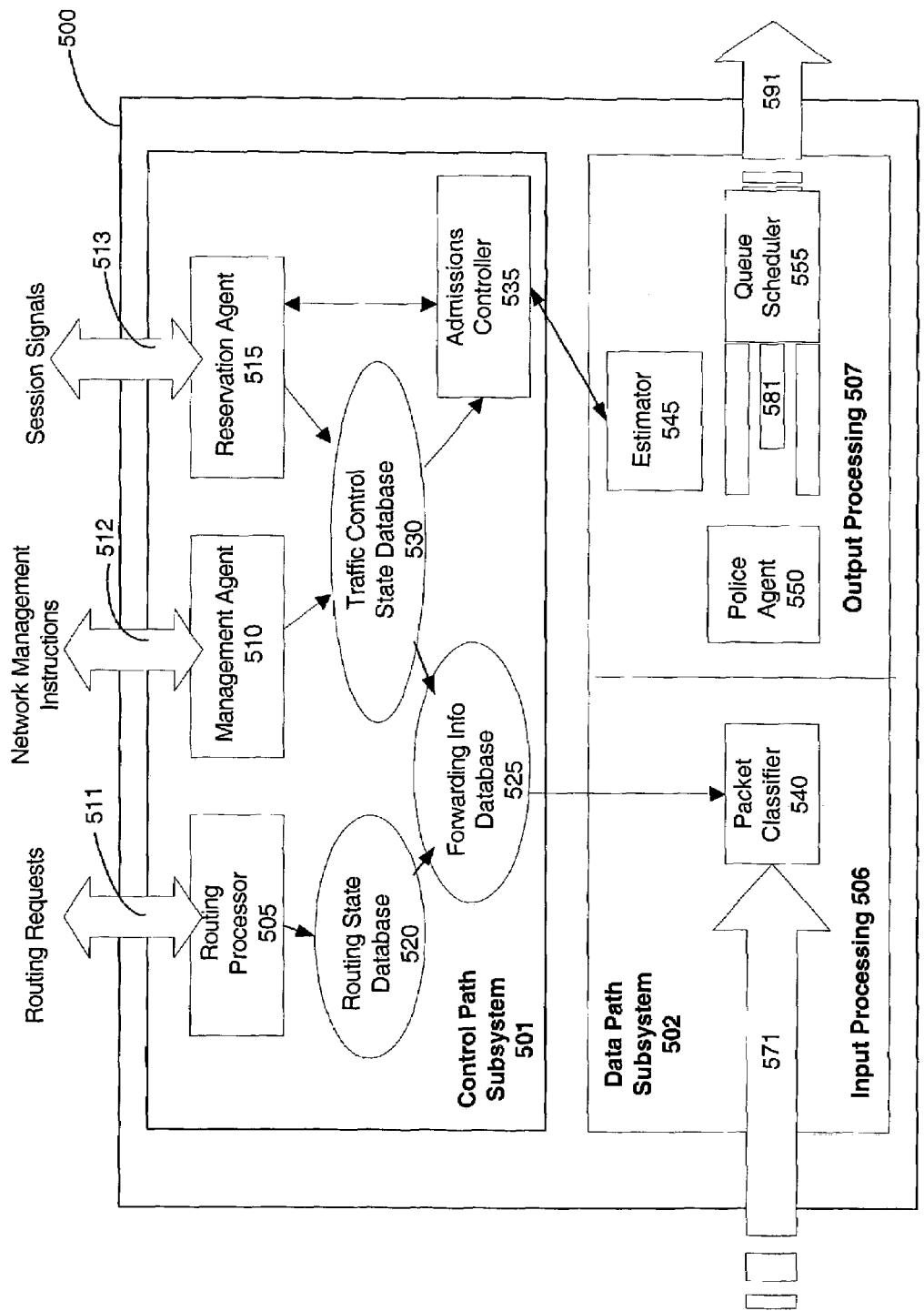
FIG. 5, which depicts a high-level block diagram of a network routing device configured in accordance with one embodiment of the present invention, illustrates the relationships between the functional components of such a device.

FIG. 5 depicts a high-level block diagram of a network routing device configured to operate in accordance with the present invention. From a functional perspective, and as illustrated by Network Routing Device 500 in FIG. 5, most network routing devices (e.g., routers and switches) are comprised of two major subsystems, namely, Control Path Subsystem 501 and the Data Path Subsystem 502. Figuratively speaking, the Control Path Subsystem 501 serves as the "brains" of the device and the Data Path Subsystem 502 serves as the "brawn." That is to say, all traffic control processing, which includes routing protocols, network management, circuit setup and teardown, etc., occurs in the Control Path Subsystem 501, while the data traffic processing (the actual process of forwarding data packets to their next destination) occurs in the Data Path Subsystem 502. In general, one or more general-purpose processors manage the Control Path Subsystem 501, while specialized hardware devices, usually in conjunction with highly customized, real time software, manage the Data Path Subsystem 502. The two major subsystems typically communicate with each other via shared memory areas, a shared data bus, a network or communications link, and/or specialized data registers (not shown in FIG. 5) residing in the network routing device.

Control Path Subsystem 501 of a Network Routing Device 500 comprises a Routing Processor 505, a Management Agent 510, a Reservation Agent 515, a Routing State Database 520, a Traffic Control State Database 530, a Forwarding Info Database 525 and an Admissions Controller 535. Control Path Subsystem 501 typically receives routing requests, network management instructions and session signals through input connections 511, 512 and 513, respectively. A detailed description of the functions typically handled by each of these individual components in a preferred embodiment of the invention follows below.

A quality of service enabled ("QOS-enabled") network is a network in which data is transmitted or processed according to multiple and possibly very diverse levels of priority. The priority level may be based on a variety of factors, such as the commercial value of the data, the price paid by the owner of the data to move the data across the network, the sensitivity of the data, etc. Finding paths (routes) through a QOS-enabled data communications network, and establishing the most cost-efficient order and transmission rates for data packets, so that a given data packet can proceed, hop by hop, from its source to its destination in accordance with specified security and precedence rules, can be a complicated task because a large number of pending QOS-specific transmission requests may need to be taken into account before any routing or flow control decision is made. In the present invention, Control Path Subsystem 501 is responsible for finding the best routes and Data Path Subsystem 502 is responsible for determining the order and transmission rate for data traffic.

For example, using ATM or RSVP, Routing Processor 505 in Control Path Subsystem 501 may receive, via input connection 511, a request for a transmission path that takes no more than a specified period of time from source to destination and that can accommodate a certain volume of traffic without undue discards. Such a request is commonly referred to as "making a reservation." The number of paths in the network qualified to satisfy this reservation varies with time as different traffic flows are imposed on and then removed from the network. Thus, what was a good path a few moments ago may no longer be a good path, if, for example, some other traffic flow has now made a large reservation across an important link in the path.

In a preferred embodiment, Routing Processor 505, which may be implemented, for example, by means of a computer software program, a microprocessor, or a combination of both, can be configured to determine the "best" path based on remaining encryption capacity information. The best path may be selected, for example, by performing arithmetic calculations based on the remaining encryption capacity for each potential link in a proposed transmission path (as described above with reference to FIGS. 1A, 1B and 2).

Routing State Database 520 is an extension of the classic routing table with sufficient network metrics (e.g., bandwidth currently reserved or unreserved on a distant link) so that QOS-aware paths can be set up through the network. In a preferred embodiment, Routing State Database 520 has been extended to include information about the remaining encryption capacity of links in the network Management Agent 510 accepts network management instructions from the network via input connection 512 and sends status information back. In QOS networks, Management Agent 510 would preferably be configured to accept new policies that govern who can and cannot make reservations, how admissions control (described below) should be performed, how packets should be classified (also described below), and so forth. In general, network management instructions received and processed by Management Agent 510 represent manifestations of policy-level network management decisions that, in practice, occur only on rare occasions relative to the more frequent and highly dynamic routing requests received and processed by Routing Processor 505 via input connection 511.

Management Agent 510 may pass network instructions to a database manager for incorporation into Traffic Control State Database 530. Traffic Control State Database 530 keeps track of all current reservation policies and the session reservations that are currently in effect. For an ATM-enabled device, which relies on the concept of creating temporary virtual circuits, this database contains such information as those virtual circuit identifiers that are currently in use, the various types of circuits that are currently operational through this switch, and so forth. RSVP contains a somewhat similar collection of information; though with more elaboration for features such as flow aggregation, multicast, and receivers with disparate reservations.

Reservation Agent 515 accepts session signaling commands from other nodes in the data communications network and, responsive to the signaling commands, sets up or tears down the necessary internal router states. In an ATM-enabled network routing device, for example, Reservation Agent 515 handles switched virtual circuit (SVC) signals. A switched virtual circuit (SVC) is a temporary virtual circuit that is established and maintained only for the duration of a data transfer session. The virtual circuit appears to be a discrete, physical circuit available only to the user but it is actually a shared pool of circuit resources used to support multiple users as they require the connections. In an RSVP-enabled network routing device, Reservation Agent 515 sends and receives RSVP control messages. In general, when a session is being set up, Reservation Agent 515 must first check with Admissions Controller 535 (described below) to ensure that there are sufficient network resources (bandwidth, memory for forwarding state, etc.) so that the traffic flow session can be admitted. If not, the requested traffic flow must be rejected.

Admissions Controller 535 is responsible for accepting or denying a request from Reservation Agent 515 to start up a new session with whatever reservation is being requested. It does so by inspecting a set of policies in Traffic Control State Database 530, on the one hand, and estimates of the remaining capacity as determined by Estimator 545 on the other. For example, Routing Processor 505 may be configured, as shown in FIG. 5, to consult Routing State Database 520 to determine the best route capable of handing the routing request.

In a preferred embodiment, Data Path Subsystem 502 comprises, as shown in FIG. 5, Input Processing 506 and Output Processing 507. Input Processing 506 comprises Packet Classifier 540 coupled to Inbound Interface Link 571. Packet Classifier 540 inspects an incoming packet received from Inbound Interface Link 571 and determines which outbound queue it should be placed on. In general, it does this by inspecting some fields within the packet and (for session-based schemes) some additional tables in its memory. As one example, an ATM classifier uses the ATM cell header fields—path and circuit identifiers—as indexes to a table of queues onto which cells should be placed. This table has been built either by network management instructions received through Management Agent 510, or by session signals for SVCs received through Reservation Agent 515. An RSVP-enabled classifier inspects fields in the IP header, such as the source and destination addresses, and uses this information as an index into a roughly equivalent table of queues.

Output Processing 507 is comprised, in a preferred embodiment, of Police Agent 550, Estimator 545, Output Queues 581, and Queue Scheduler 555. Police Agent 550 checks that each flow's offered load stays within the bounds that were determined at session setup time for that flow. If the offered load exceeds that rate, the excess packets may be discarded or shunted to a lower traffic class. Otherwise they are kept at the class established by Packet Classifier 540. In either case, the packet is then placed onto the appropriate queue in Output Queues 581. The exact semantics of policing can vary since the current "offered load" can vary quite a bit, even for a packet flow that is produced at a constant rate, due to "clumping" of packets somewhere upstream in the network. Thus, the current flow may be averaged across a certain period of time so that flows are not unduly penalized when they shouldn't be. In an ATM-enabled device, for example, Police Agent 550 is responsible for measuring the incoming cell rate on a given virtual circuit to ensure that this rate is within the bounds established at circuit setup time. RSVP uses a similar scheme.

Estimator 545 is responsible for observing the actual behavior of the queuing system, as opposed to its theoretical ideal behavior, and informing Admissions Controller 535 accordingly. This function is required in many cases because outgoing traffic cannot be perfectly scheduled and so some fine-grain tuning must be applied via Admissions Controller 535 so that flows are not admitted when in fact they cannot be accommodated.

Queue Scheduler 555 manages Output Queues 581 and determines which queue should next have a packet removed from its head and placed onto Outbound Interface Link 591. In a pure priority scheme, for example, the Queue Scheduler 555 always tries to de-queue the packet from the highest priority queue. If this queue is empty, it tries the next highest; and so forth. In a round robin scheduling scheme, it de-queues a packet from each queue in turn so that every queue has the same priority as all the others. In the widely used Weighted Fair Queuing (WFQ) approach, Queue Scheduler 555 is responsible for giving each queue its fair share of the output bandwidth, where "fair share" has been determined by policy decisions received from Management Agent 510.

Figure 6:
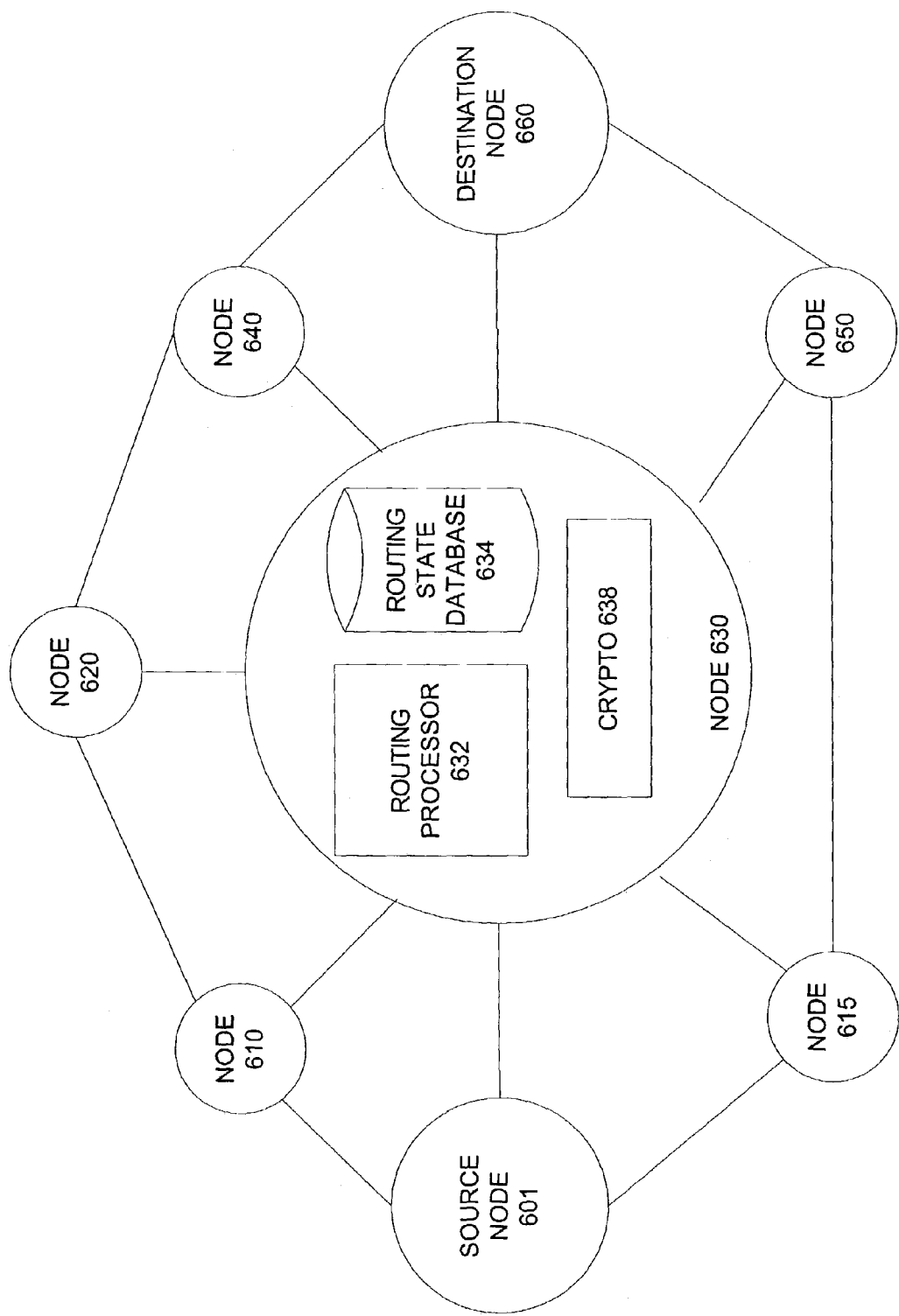
FIG. 6, which depicts another high-level block diagram of a data communications network configured to operate in accordance with the present invention, illustrates how one of the nodes may include a crypto, a routing processor and a routing state database.

FIG. 6 depicts another high-level block diagram of a data communications network configured to operate in accordance with the present invention. The data communications network shown in FIG. 6 comprises eight nodes (designated Nodes 601, 610, 615, 620, 630, 640, 650 and 660), each of which may itself comprise some kind of network component, such as a host computer, a network router, a switch or a gateway to another network. Data may travel through the network shown in FIG. 6 along a number of different potential routes from Source Node 601 to Destination Node 660. For illustrative purposes, Node 630 in FIG. 6 is drawn to show that it includes a Routing Processor 632, a Routing State Database 634 and a cryptographic subsystem (designated Crypto 638).

In a preferred embodiment, Routing Processor 632 in FIG. 6 is configured to perform some or all of the functions of Routing Processor 505 in FIG. 5 (discussed above). Similarly, Routing State Database 634 is configured, in a preferred embodiment, to perform some or all of the functions performed by Routing State Database 520 in FIG. 5 (also discussed above). Crypto 638 operates in accordance with Cryptos 303A and 303B, which are discussed in detail above with reference to FIG. 3. Although such details are not shown in FIG. 6, it will be appreciated by those skilled in the art that any one of the Nodes 601, 610, 615, 620, 640, 650 and 660, or all of them, may also include routing processors, routing state databases and cryptographic subsystems like the ones illustrated in Node 630, and that such configurations are encompassed within the scope of the present invention.

Figure 7A:
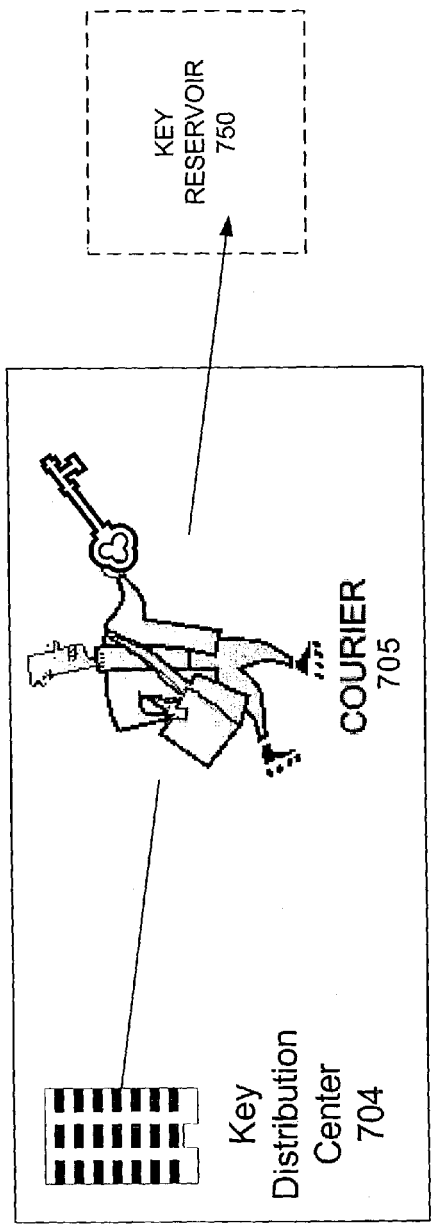
FIGS. 7A and 7B depict two kinds of key distribution systems that could be used in conjunction with embodiments of the present invention.

Various forms of key distribution systems may be used in conjunction with the present invention to provide additional keying material for the key material storage areas (key reservoirs). FIG. 7A illustrates one example of a traditional key distribution system that may be used in conjunction with the present invention. As shown in FIG. 7A, encryption keys may be distributed by having a human courier 705 hand carry keying material from a Key Distribution Center 704 to a Key Reservoir 750. The keying material may also be carried from Key Distribution Center 705 to Key Reservoir 750 by means of a modem or local area network (LAN) connection (not shown in FIG. 7A or 7B), or by wireless transmissions such as by radio; in such techniques the new keying material itself is generally encrypted in transmission so that it cannot be read and used by adversaries. The key material generator may reside at Key Distribution Center 704, at Key Reservoir 750, or elsewhere within or outside of the data communications network. In a public-key based system, keys are generated at the communicating parties by means of a key agreement protocol, such as the well-known Diffie-Hellman key exchange system.

Figure 7B:
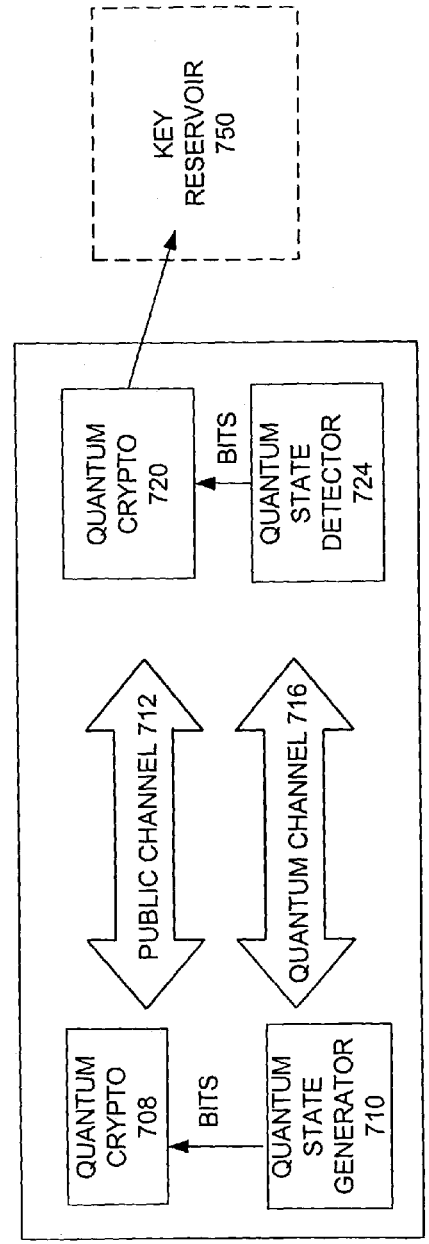

As stated above, quantum cryptographic protocol engines that employ polarized or phase-encoded photons, among other techniques, may also be used with the present invention to derive and distribute shared keying material. FIG. 7B shows an example of a quantum key distribution scheme, which involves using two communications channels: a Quantum Channel 716, through which users send polarized or phase-encoded photons representing encryption keys; and a Public Channel 712, through which users send ordinary messages. Since the polarized (or phase-encoded) photons moving through the quantum key transmission channel are employed for quantum key distribution (QKD), they may be called "QKD photons." A Quantum State Generator 710 generates the polarized or phase-encoded QKD photons and transmits them, via Quantum Channel 716, to a Quantum State Detector 724. Quantum Channel 716, which may comprise an optical fiber cable connection or a free space path suitable for photonic transmission, for example, isolates the QKD photons from interacting with the environment during transmission. Public Channel 712 may comprise a channel on any type of communication network such as a public switched telephone network, the Internet, or a wireless network. Quantum Cryptography subsystems at each end of Public Channel 712 (designated Quantum Crypto 708 and Quantum Crypto 720 in FIG. 7) transmit and receive information via Public Channel 712 sufficient to compare the polarization or phases of the QKD photons passed and received via Quantum Channel 716.

Assume, for example, that two users, Alice and Bob, use polarized and phase encoded photons to send keys to each other over the quantum channel. An eavesdropper, Eve, may attempt to measure the photons on the quantum channel to ascertain the value of the secret encryption keys the QKD photons represent. Such eavesdropping, however, generally will induce a measurable disturbance in the photons in accordance with the "No Cloning Theorem," which states that a photon's full quantum state cannot be measured or exactly copied. Alice and Bob use Public Channel 712 (such as by sending messages through the Internet or talking on the phone) to discuss and compare the photons sent through the quantum channel. If, through their discussion and comparison, they determine that there are no measurable disturbances in the QKD photons and, thus, no evidence of eavesdropping, then the key material distributed via Quantum Channel 716 can be considered completely secret. It may then be used as encryption keys for communications between Alice and Bob. In the embodiment shown in FIG. 7A, Alice and Bob may be replaced (automated) with Quantum Cryptos 708 and 720, which may comprise, for example computers, computer programs and/or algorithms.

These are but a few examples of key distribution systems that may be advantageously configured to work with the present invention. Other key distribution systems (not described here) may be implemented by means known to those of skill in art.

Figure 8:
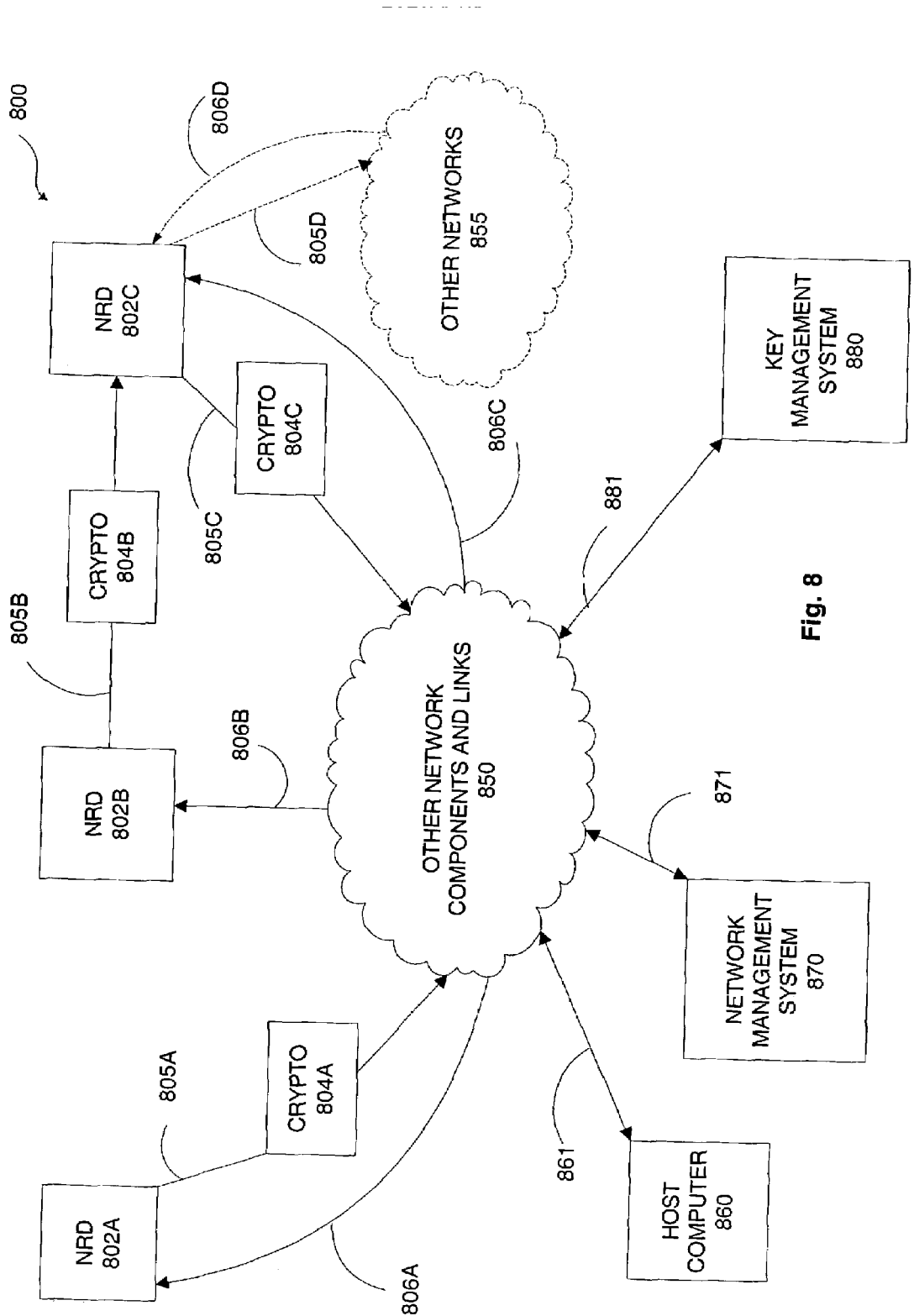
FIG. 8 depicts a high-level block diagram of a data communications network configured to operate in accordance with an embodiment of the present invention, which comprises multiple network routing devices (e.g., routers and/or switches), as well as a host computer, a network management system, a key management system and links to other networks.

FIG. 8 depicts a high-level block diagram of a data communications network configured to operate in accordance with an embodiment of the present invention. The Data Communications Network 800 of FIG. 8 contains multiple network routing devices (e.g., routers and/or switches) 802A, 802B and 802C, which are coupled to each other and Other Network Components and Links 850 via outgoing links 805A, 805B and 805C, and incoming links 806A, 806B and 806C. Outgoing Links 805A, 805B and 805C are protected by cryptographic subsystems (designated Cryptos 804A, 804B and 804C in FIG. 8), which periodically send out reports indicating the remaining encryption capacities for Outgoing Links 805A, 805B and 805C. Data Communications Network 800 also comprises a Host Computer 850, a Network Management System 870, a Key Management System 880, which are coupled to the Other Network Components and Links 850 via links 861, 871 and 881. In a preferred embodiment, Host Computer 850, Network Management System 870 and Key Management System 880 are also configured, like Network Routing Devices 802A, 802B and 802C, to receive and respond to the remaining encryption capacity reports sent out by Cryptos 804A, 804B and 804C. Key Management System 880 includes a key distribution system, examples of which are discussed in more detail above with reference to FIGS. 7A and 7B. Finally, the Data Communications Network 800, as shown in FIG. 8, may be coupled to and communicate with other data communications networks (shown in FIG. 8 as Other Networks 855) via links 805D and 806D. The components and links contained in Other Networks 855 may or may not be configured to operate according to remaining encryption capacity metrics.

The above-described preferred embodiments are intended to illustrate the principles of the invention, but not to limit its scope. Various other embodiments, modifications and equivalents to these preferred embodiments may occur to those skilled in the art upon reading the present disclosure or practicing the claimed invention. Such variations, modifications and equivalents are intended to come within the scope of the invention and appended claims.

What is claimed is:

1. A system for routing data packets over a selected network interface link of a data communications network, comprising:
   a network routing device coupled to at least two potential network interface links, each one of the at least two potential network interface links being protected by a cryptographic subsystem comprising
   key material stored in a key storage area,
   a cryptographic engine configured to use at least a portion of the key material to encrypt the data packets before transmitting the data packets over the selected network interface link, and
   a key storage area information channel configured to convey to the network routing device a report comprising an indicator of a remaining encryption capacity for the cryptographic subsystem, wherein the indicator of the remaining encryption capacity comprises a quantitative measure representative of a capacity of the cryptographic engine to encrypt subsequent data packets;

wherein the network routing device is configured to determine, based on the indicator, which one of the potential network interface links will be the selected network interface link.

2. The system of claim 1, wherein the indicator is based on the an amount of key material in the key storage area.

3. The system of claim 1, wherein the indicator is based on data representing an amount of time elapsed since a prior report was conveyed.

4. The system of claim 1, wherein the indicator is based on data representing an amount of time elapsed since the key material was replenished.

5. The system of claim 1, wherein the indicator is based on data representing a quantity of data packets encrypted by the cryptographic subsystem since a prior report was conveyed.

6. The system of claim 1, wherein the indicator comprises a quantity of additional data packets the cryptographic engine can encrypt prior to the key material in the key storage area being exhausted.

7. The system of claim 1, wherein the indicator comprises a rate at which the key material is being used by the cryptographic engine.

8. The system of claim 1, wherein the network routing device includes a database for storing the report.

9. The system of claim 1, wherein the report is conveyed to at least one other network routing device coupled to the data communications network.

10. The system of claim 1, wherein the report is conveyed to a network management system coupled to the data communications network.

11. The system of claim 1, wherein the report is conveyed to a key management system coupled to the data communications network.

12. The system of claim 1, wherein the report is conveyed to a host computer coupled to the data communications network.

13. The system of claims 1, 9, 10, 11 or 12, wherein the report is conveyed in response to an occurrence of a specified event.

14. The system of claims 1, 9, 10, 11 or 12, wherein the report is conveyed in response to a specified condition for the interface link.

15. The system of claims 1, 9, 10, 11 or 12, wherein the report is conveyed when an amount of key material in the key storage area reaches a specified level.

16. The system of claims 1, 9, 10, 11 or 12, wherein the report is conveyed when the key material has been present in the key storage area for a specified time period.

17. The system of claim 1, wherein the network routing device includes a statistical analyzer configured to generate an estimated remaining encryption capacity based on the report.

18. The system of claim 1, further comprising a key material distribution system configured to provide the key storage area with additional key material.

19. The system of claim 18, wherein the key material distribution system comprises a quantum cryptological subsystem.

20. The system of claim 18, wherein the key material distribution system comprises a key-filling device.

21. The system of claim 18, wherein the key material distribution system comprises a centralized secret key management system.

22. The system of claim 18, wherein the key material distribution system comprises a distributed secret key management system.

23. The system of claim 18, wherein the key material distribution system includes a mathematical-process for agreeing on a secret key.

24. The system of claim 23, wherein the mathematical process comprises the Diffie-Hellman technique.

25. The system of claim 1, wherein the report is conveyed to the network routing device in response to a request generated by the network routing device.

26. The system of claim 1, wherein the report is conveyed to the network routing device at a specified time.

27. The system of claim 1, wherein the report is conveyed to the network routing device in response to the expiration of a specified time interval.

28. The system of claim 1, wherein the report is conveyed to the network routing device in response to a specified condition.

29. The system of claim 1, further comprising:
a source network element;
a target network element;
at least two data communication paths between the source network element and the target network element, at least one of the data communication paths comprising the network routing device, the interface link, the cryptographic subsystem and the key storage area information channel; and
a routing processor configured to determine, based on the report, which one of the at least two communication paths will be used to transmit the data packets from the source network element to the target network element.

30. The system of claim 29, wherein the routing processor resides in the source network element.

31. The system of claim 29, wherein the routing processor resides in the target network element.

32. The system of claim 1, wherein the report is conveyed using a link-state based routing protocol.

33. The system of claim 32, wherein the link-state based routing protocol comprises the Open Shortest Path First (OSPF) Protocol.

34. The system of claim 32, wherein the link-state based routing protocol comprises the Constraint-based Routing Label Distribution Protocol (CR-LDP).

35. The system of claim 32, wherein the link-state based routing protocol comprises the Intermediate System to Intermediate System (IS—IS) Protocol.

36. The system of claim 32, wherein the link-state based routing protocol is employed in conjunction with Multiprotocol Label Switching (MPLS).

37. The system of claim 32, wherein the link-state based routing protocol is employed in conjunction with Asynchronous Transfer Mode (ATM).

38. The system of claim 32, wherein the link-state based routing protocol is employed in conjunction with the Resource Reservation Protocol (RSVP).

39. The system of claim 32, wherein the link-state based routing protocol is employed in conjunction with the Routing Information Protocol (RIP).

40. The system of claim 1, wherein the report is conveyed using a distance vector routing protocol.

41. The system of claim 40, wherein the distance vector routing protocol is employed in conjunction with the Resource Reservation Protocol (RSVP).

42. The system of claim 1, wherein the report is conveyed using the Border Gateway Protocol (BGP).

43. The system of claim 1, wherein the report is conveyed using the Simple Network Management Protocol (SNMP).

44. The system of claim 1, wherein the report is conveyed using the Synchronous Optical Network (SONET) protocol.

45. The system of claim 1, wherein the report is conveyed using the Internet Control Message Protocol (ICMP).

46. A programmed computer coupled to at least two network interface links, the programmed computer comprising:
a memory having at least one region for storing computer executable program code; and
a processor for executing the program code stored in said memory;
wherein the program code includes code, responsive to a report received from a cryptographic subsystem indicating a remaining encryption capacity for the cryptographic subsystem including a quantitative measure representative of a capacity of the cryptographic subsystem to encrypt subsequent data packets, that determines which one of the at least two network interface links will be selected to transmit encrypted data packets and provides instructions that identify the network interface link to transmit the encrypted data packets based on the report.

47. The programmed computer of claim 46, wherein the cryptographic subsystem comprises key material stored in a key storage area;
a cryptographic engine configured to use at least a portion of the key material to encrypt the data packets before transmitting the data packets over the selected network interface link; and
a key storage area information channel configured to convey the report to the programmed computer.

48. A method for routing data packets over a selected network interface link of a data communications network, comprising:
providing a network routing device coupled to at least two network interface links, at least one of the two network interface links being protected by a cryptographic subsystem configured to encrypt data packets;
receiving a report from the cryptographic subsystem comprising an indicator of a remaining encryption capacity for the cryptographic subsystem, wherein the indicator of the remaining encryption capacity comprises a quantitative measure representative of a capacity of the cryptographic engine to encrypt subsequent data packets;
determining, based on the indicator, which one of the at least two network interface links will be the selected network interface link; and
transmitting the data packets over the selected network interface link.

49. The method of claim 48, wherein
the cryptographic subsystem comprises a key storage area configured to store a key material; and
the indicator is based on an amount of key material stored in the key storage area.

50. The method of claim 49, wherein the indicator is based on data representing an amount of time elapsed since the key material was replenished.

51. The method of claim 49, wherein the indicator comprises a rate at which the key material is being used by the cryptographic engine.

52. The method of claim 49, wherein the indicator comprises a quantity of additional data packets the cryptographic engine can encrypt prior to the key material in the key storage area being exhausted.

53. The method of claim 48, wherein the indicator is based on data representing an amount of time elapsed since a prior report was received.

54. The method of claim 48, wherein the indicator is based on data representing a quantity of data packets encrypted by the cryptographic subsystem since a prior report was received.

55. The method of claim 48, wherein the network routing device includes a database for storing the report.

56. The method of claim 48, wherein the report is conveyed to at least one other network routing device coupled to the data communications network.

57. The method of claim 48, wherein the report is conveyed to a network management system coupled to the data communications network.

58. The method of claim 48, wherein the report is conveyed to a key management system coupled to the data communications network.

59. The method of claim 48, wherein the report is conveyed to a host computer coupled to the data communications network.

60. The method of claims 48, 56, 57, 58 or 59, wherein the report is conveyed in response to an occurrence of a specified event.

61. The method of claims 48, 56, 57, 58 or 59, wherein the report is conveyed in response to a specified condition for the interface link.

62. The method of claims 48, 56, 57, 58 or 59, wherein the report is conveyed when an amount of key material in the key storage reaches a specified level.

63. The method of claims 48, 56, 57, 58 or 59, wherein the report is conveyed when the key material has been present in the key storage for a specified time period.

64. The method of claim 48, wherein the network routing device includes a statistical analyzer configured to generate an estimated remaining encryption capacity based on the report.

65. The method of claim 49, further comprising providing the key storage area with additional key material.

66. The method of claim 48, wherein the network routing device receives the report in response to a request generated by the network routing device.

67. The method of claim 48, wherein the network routing device receives the report at a specified time.

68. The method of claim 48, wherein the network routing device receives the report in response to the expiration of a specified time interval.

69. The method of claim 48, wherein the network routing device receives the report in response to a specified condition.

* * * * *